United States Patent [19]

Kagami et al.

[11] Patent Number: 5,459,309
[45] Date of Patent: Oct. 17, 1995

[54] FOCUS ACQUIRING METHOD AND OPTICAL DISK DRIVE

[75] Inventors: Naoyuki Kagami, Fujisawa; Makoto Takekoshi, Yokohama, both of Japan

[73] Assignee: International Business Machines Corporation, Armonk, N.Y.

[21] Appl. No.: 138,028

[22] Filed: Oct. 19, 1993

[30] Foreign Application Priority Data

Oct. 21, 1992 [JP] Japan .................... 4-282690

[51] Int. Cl.$^6$ .................................................. G11B 7/00
[52] U.S. Cl. ................................... 250/201.5; 269/54
[58] Field of Search ................. 259/201.5; 269/44.29, 269/44.32, 44.35, 32, 44.32, 54

[56] References Cited

U.S. PATENT DOCUMENTS 5,233,586  8/1993  Morisada ..................... 369/44.32
5,289,447  2/1994  Kobayashi et al. ............. 369/44.32

*Primary Examiner*—William L. Sikes
*Assistant Examiner*—Fetsum Abraham
*Attorney, Agent, or Firm*—D. A. Shifrin

[57] ABSTRACT

The present invention ensures successful focus acquisition in an optical disk drive independent of a travelling speed of an objective lens at the time when a focus servo circuit loop is closed. The present invention provides sending a signal to a focus actuator for bringing an objective lens close to an in-focus position while a focus servo circuit loop is opened; closing the loop by shutting off the signal sent to the focus actuator; adding an offset of a predetermined level to the focus error signal; detecting that the focus error signal to which the offset is added reaches a predetermined level; and closing the loop when it is detected that the predetermined level is reached, and gradually decreasing the value of the offset to be added to the focus error signal.

4 Claims, 4 Drawing Sheets

FOCUS ACQUIRING METHOD AND OPTICAL DISK DRIVE

TECHNICAL FIELD OF THE INVENTION

The present invention generally relates to an optical disk drive apparatus and more particularly to a method of and a device for acquiring focus in such an optical disk drive apparatus.

BACKGROUND OF THE INVENTION

In an optical disk drive apparatus, it is necessary to control a focus servo to ensure that the surface of the disk remains always within the focal depth of the objective lens since the axial deflection of a disk can range from about 100 to 200 micrometers while the focal depth of an objective lens is only from about 1 to 2 micrometers. FIG. 6 shows a conventional configuration for such a focus servo. A focus error signal to be used for focus servo control is detected by using a known method such as an astigmatic method, a knife edge method, a beam size method, or a wedge prism method. A focus error signal to be detected by using any of the above methods has a so-called S-curve characteristic in the vicinity of an in-focus position of an objective lens as shown in FIG. 7.

In the S-curve of FIG. 7, an ordinate and an abscissa indicate a focus error signal and a relative distance between a disk 600 and an objective lens 604, respectively. In FIG. 7, a direction from the left to the right is one in which the objective lens 604 approaches the disk 600, and the zero-crossing point of the S-curve represents a position of the objective lens 604 at the time when the light beam is focused.

The operations of conventional focus servo control are described by reference to FIG. 7 and FIG. 8. The abscissa in FIG. 8 indicates time. If focus acquisition begins outside the range AB in FIG. 7, focus acquisition fails since the focus servo loop offers positive feedback. Focus acquisition, therefore, needs to be started within the range AB shown in the figure. Accordingly, before focus acquisition is started, a contact of a switch 618 is switched to a ramp circuit 616 to keep the focus servo loop open. After the objective lens 604 is moved away from the disk 600 by means of the ramp circuit 616, it is gradually brought close to the disk 600 again. And, when a zero-crossing detecting circuit 612 detects a zero-crossing of a focus error signal whose peak has passed, a microprocessor 614 switches over the contact of the switch 618 to a focus error signal generator 610 to close the focus servo loop. Thus, a focus actuator 606 of an optical head 608 is provided with a drive signal by means of a phase compensating circuit 620 and a focus actuator driver 622 to control the position of the objective lens 604 so as to ensure that the surface of the disk remains within the focal depth of the objective lens 604. The functions of the phase compensating circuit 620 and the focus actuator driver 622 are well-known to those skilled in the art and further description is omitted.

The ramp circuit 616 generally generates a sawtooth wave of a relatively low frequency. However, if a travelling speed of the objective lens 604 is too high at the time of zero-crossing of a focus error signal, the objective lens 604 will overshoot, as indicated by the broken line 800 in FIG. 8, and focus acquisition will fail. Such a change of a travelling speed of the objective lens can occur due to variations in focus error signals between optical systems, catching of the focus actuator, abrupt deflection of the disk surface and the like. In addition, if the optical disk drive apparatus itself is installed on the tilt, the travelling speed of the objective lens 604 widely differs depending on how gravity affects the objective lens 604.

To solve the above problem, one proposed method decreases the generated voltage of the ramp circuit 616 to slowly move the objective lens 604. This method, however, requires excessive time for focus acquisition. To solve the problem of a change of travelling speed of the objective lens 604 due to gravity, another method provides means for detecting an installation angle of the optical disk drive apparatus and changing a generated voltage of the ramp circuit 616 based on the detected angle; this method requires the extra means for detecting the installation angle.

OBJECTS AND SUMMARY OF THE INVENTION

Accordingly, it is an object of the present invention to provide a simplified method and apparatus that ensure focus acquisition independent of the travelling speed of an objective lens at the time when the focus servo loop is closed.

To accomplish the foregoing object in an optical disk drive apparatus having a spindle motor for rotating a disk, an optical head including an objective lens and a focus actuator for driving the objective lens in the focussing direction, and a focus servo circuit for controlling a focus servo as a function of a focus error signal, a focus acquisition method according to the present invention comprises the steps of: adding an offset to the focus error signal while the focus servo circuit loop is open; bringing the objective lens close to an in-focus position while the loop is open; detecting if the focus error signal to which the offset is added reaches a predetermined level; and, if it is detected that the focus error signal to which the offset is added reaches the predetermined level, closing the focus servo loop and gradually decreasing the value of the offset.

To accomplish said object in an optical disk drive apparatus having a spindle motor for rotating a disk, an optical head including an objective lens and a focus actuator for driving the objective lens in the focusing direction, and a focus servo circuit for controlling focus servo as a function of a focus error signal, another focus acquisition method according to the present invention comprises the steps of: bringing the objective lens close to an in-focus position while the focus servo circuit loop is open; detecting that the focus error signal reaches a predetermined level; and, if it is detected that the focus error signal reaches the predetermined level, closing the loop, immediately adding an offset to the focus error signal, and then gradually decreasing the value of the offset.

To accomplish said object in an optical disk drive apparatus having a spindle motor for rotating a disk, an optical head including an objective lens and a focus actuator for driving the objective lens in the focusing direction, and a focus servo circuit for controlling focus servo as a function of a focus error signal, another embodiment of the present invention comprises: signal generating means for providing the focus actuator with a signal for bringing the objective lens close to an in-focus position while the focus servo circuit loop is open; switching means for closing the loop of the focus servo circuit by terminating a signal to be provided to the focus actuator from the signal generating means; offset means for adding an offset to a focus error signal; level detecting means for detecting that the focus error signal to which the offset is added reaches a predetermined level; and, control means for enabling the switching means in response to the level detecting means when it detected that the predetermined level is reached, and for gradually decreasing a value of the offset.

To accomplish said object in an optical disk drive apparatus having a spindle motor for rotating a disk, an optical head including an objective lens and a focus actuator for driving the objective lens in the focusing direction, and a focus servo circuit for controlling the focus servo as a function of a focus error signal, still another embodiment comprises: signal generating means for providing the focus actuator with a signal for bringing the objective lens close to an in-focus position while the focus servo circuit loop is open; switching means for closing the loop of the focus servo circuit by terminating a signal to be provided to the focus actuator from the signal generating means; offset means for adding an offset to a focus error signal; level detecting means for detecting that the focus error signal to which the offset is added reaches a predetermined level; and, control means for enabling the switching means when the level detecting means detects that the predetermined level is reached, and for gradually decreasing a value of the offset.

To accomplish said object in an optical disk drive apparatus having a spindle motor for rotating a disk, an optical head including an objective lens and a focus actuator for driving the objective lens in the focusing direction, and a focus servo circuit for controlling the focus servo as a function of a focus error signal, still another embodiment comprises: signal generating means for providing the focus actuator with a signal for bringing the objective lens close to an in-focus position while the focus servo circuit is open; switching means for closing the loop of the focus servo circuit by terminating a signal provided to the focus actuator from the signal generating means; level detecting means for detecting that a focus error signal reaches a predetermined level; and control means for enabling the switching means when the level detecting means detects that the predetermined level is reached, immediately adding an offset to the focus error signal, and then gradually decreasing a value of the offset.

The foregoing and other features and advantages of the invention will be apparent from the following more particular description of preferred embodiments of the invention, as illustrated in the accompanying drawings.

DETAILED DESCRIPTION OF THE INVENTION

Figure 1:
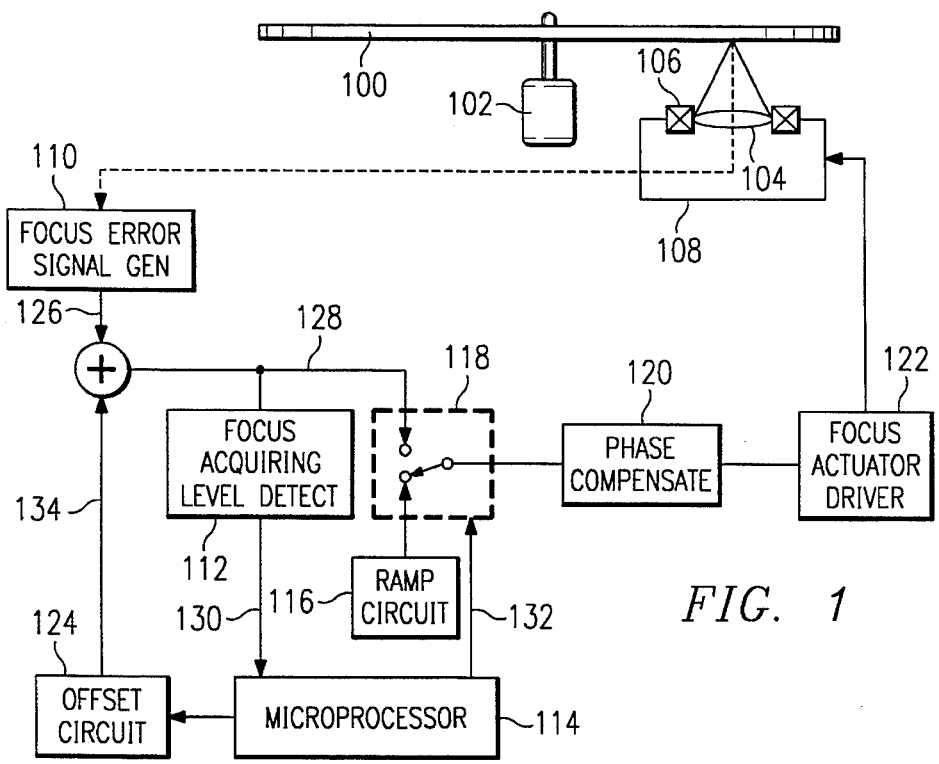
FIG. 1 is a diagram showing the configuration of an embodiment of an optical disk drive apparatus according to the present invention.

FIG. 1 shows the configuration of an embodiment according to the present invention. A disk 100 is rotated by a spindle motor 102. An optical head 108 includes an objective lens 104 and a focus actuator 106 which drives the objective lens 104 in a direction perpendicular to the surface of the disk (the focusing direction). A focus error signal is obtained from a focus error signal generating circuit 110 by using, for example, light reflected from the surface of the disk 100. To obtain the focus error signal, for example, an astigmatic method, a knife edge method, a beam size method, or a wedge prism method can be used. The focus error signal has a so-called S-curve characteristic when the objective lens 104 is close to an in-focus position as shown in FIG. 7.

A focus servo circuit for controlling a focus servo based on a focus error signal comprises the focus error signal generating circuit 110, a phase compensating circuit 120, and a focus actuator driver 122. While the focus servo loop is closed, control to drive the objective lens 104 in the focusing direction is performed so that the surface of the disk 100 is always within a focal depth of the objective lens 104.

Figure 7:
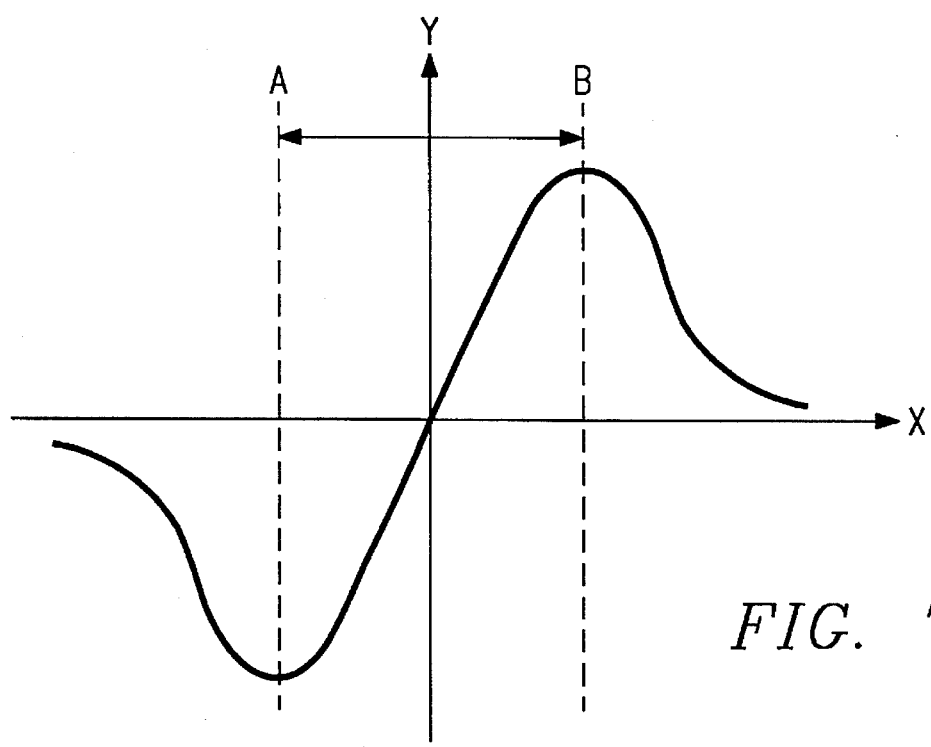
FIG. 7 is a diagram showing a waveform of a focus error signal in the vicinity of an in-focus position of the objective lens.
Figure 8:
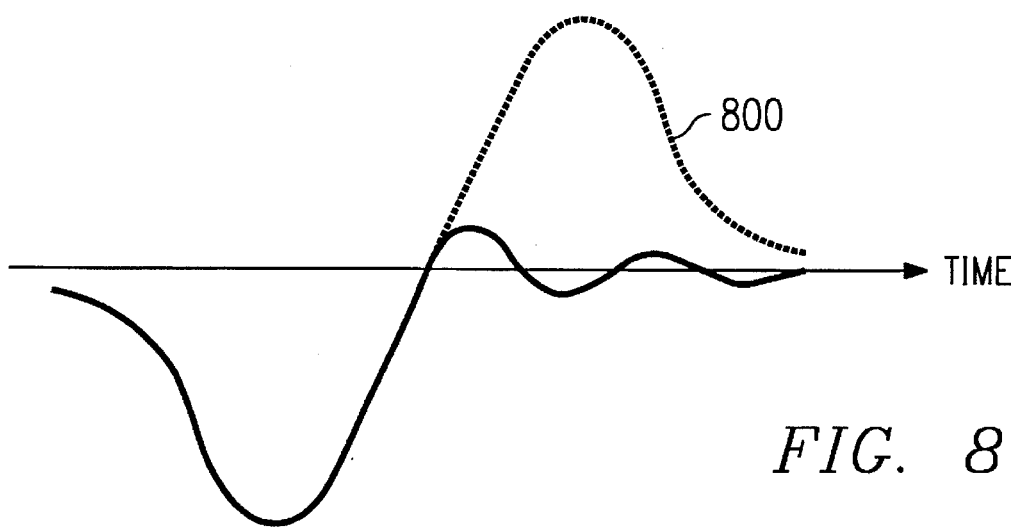
FIG. 8 is a diagram showing temporal changes of the focus error signal of FIG. 7 in the case where focus acquisition is successfully completed.

The loop of the focus servo circuit must be closed within the range AB of the S-curve shown in FIG. 7, that is, in the vicinity of an in-focus position of the objective lens 104 where focus acquisition is possible. Consequently, the objective lens 104 is moved by means of a ramp circuit 116 into a position where focus acquisition is possible. The ramp circuit 116 generates a sawtooth wave or triangular wave of a low frequency. In the case of a sawtooth wave, the objective lens 104 is first moved away from the surface of the disk 100 and then gradually brought close to the surface again. Alternatively, the objective lens 104 may be first brought close to and then gradually moved away from the surface of the disk 100. In the case of a triangular wave, the objective lens 104 is repeatedly moved away from and brought close to the surface of the disk 100. The present invention does not depend on the particular waveform of the signal generated by the ramp circuit.

Figure 2:
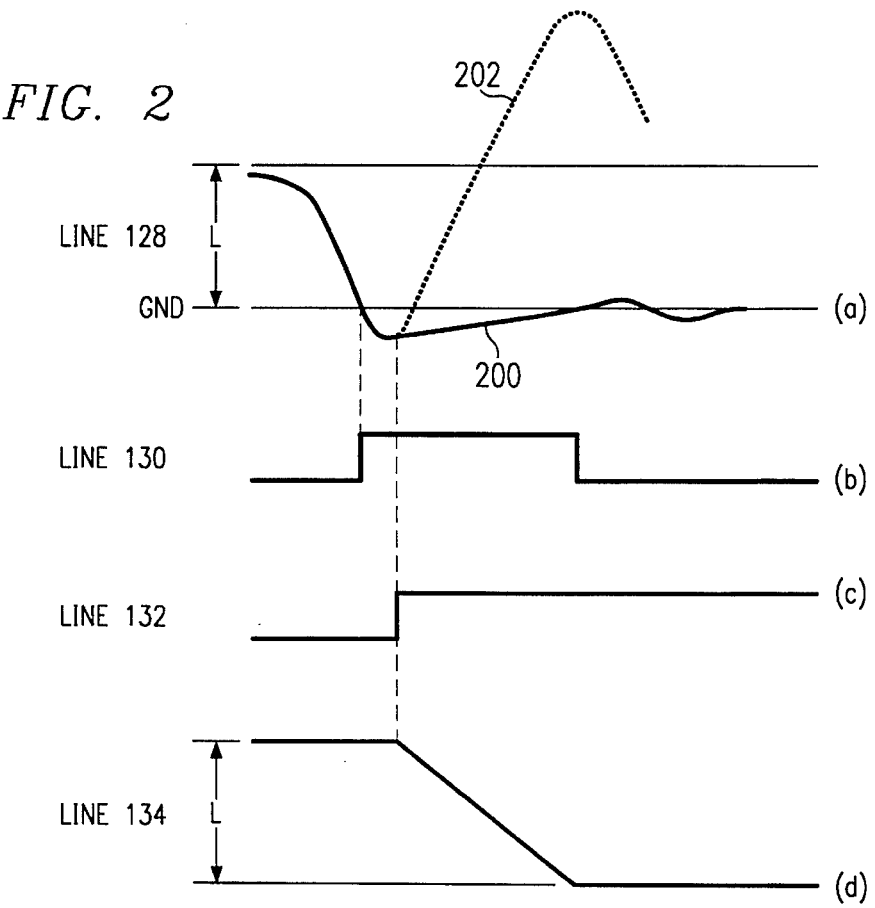
FIG. 2 is a diagram showing a first method of operation of the embodiment of the optical disk drive apparatus according to the present invention.

The objective lens 104 is driven by means of the ramp circuit 116 while a contact of a switch 118 is switched to the ramp circuit side and the loop of the focus servo circuit is open. According to the present invention, the optical disk drive apparatus also includes an offset circuit 124. In a first embodiment, the operation of which is shown in FIG. 2, an offset having a predetermined level is added to a focus error signal (line 126) by the offset circuit 124 while the loop is kept closed. FIG. 2(*d*) shows a temporal change in a value of the offset to be added to the focus error signal while FIG. 2(*a*) shows a temporal change in a value of the focus error signal (line 128) after this offset is added.

The magnitude L of the offset to be added to the focus error signal while the focus servo circuit loop is kept closed is set in consideration of variations in focus error signals between optical disk drive apparatuses. The magnitude L of the offset is set to a value smaller than the maximum of the variations in peaks of focus error signals to ensure that any focus error signal is able to cross a zero or ground level (GND).

When an acquiring level detecting circuit 112 in FIG. 1 detects that a focus error signal has reached the ground level shown in FIG. 2(a), a signal (line 130) indicating this detection is provided to a microprocessor 114 from the acquiring level detecting circuit 112. As shown in FIG. 2(c), the microprocessor 114 generates a loop-on signal (line 132) for enabling the switch 118 in response to that detection. In the embodiment shown in FIG. 2, the loop-on signal is outputted after the detection shown in FIG. 2(b), but the loop-on signal can instead be outputted simultaneously with the detection shown in FIG. 2(b) because the objective lens 104 is already in process of moving toward an in-focus position by means of the ramp circuit 118 at the time of the detection shown in FIG. 2(b), and, if the loop is closed at that time, focus acquisition will probably succeed. However, if the travelling speed of the objective lens 104 becomes zero at the time of the detection indicated in FIG. 2(b) for such reason as an abrupt axial deflection of the disk 100, focus acquisition can fail. It is therefore preferable that the generation of the loop-on signal should be timed somewhat later than the time of the detection indicated in FIG. 2(b). In a preferred embodiment, as shown in FIG. 2(c), the loop-on signal is outputted when a peak period of the original focus error signal (that is, a focus error signal to which an offset is not yet added (line 126)) has been passed.

When the loop-on signal is outputted, a contact of the switch 118 is changed over from the ramp circuit side to the focus error signal side. Accordingly, a signal from the ramp circuit 116 is shut off and the loop of the focus servo circuit is closed. In addition, as shown in FIG. 2(d), the microprocessor 114 causes the value of the offset to gradually decrease from L to zero after the loop-on signal has been outputted. Thus, as indicated by a curve 200 in FIG. 2(a), the focus servo is controlled as if the objective lens 104 was always very close to an in-focus position. This prevents overshooting of the objective lens 104, since acceleration of the objective lens 104 does not become too large. By contrast, if no offset is applied, it is highly possible that the objective lens 104 will easily overshoot and that focus acquisition will fail due to a long acceleration range, indicated by a broken line 202 in FIG. 2(a), before the in-focus position is reached, especially if the travelling speed of the objective lens 104 is already high when the loop is closed. According to the present invention, the range of acceleration of the objective lens 104 becomes short as compared with the cases where no offset is applied, since the focus servo is controlled as if the objective lens 104 was always very close to the in-focus position. Even if the travelling speed of the objective lens 104 is already high when the loop is closed, overshooting does not occur and successful focus acquisition is ensured since the range of acceleration is very short while the range of deceleration is sufficiently long.

The decrease in the value of the offset from L to zero in the embodiment of FIG. 2 is linear, as shown in FIG. 2(d). It is preferable that the rate of the decrease, that is, the slope of the straight line, is much the same as that of a predictable average travelling speed of the objective lens 104 at the time of loop-on. Alternatively, however, the decrease in the value of the offset may be nonlinear so as to follow the predictable movement of the objective lens 104 at the time of loop-on.

Next, the operation of another embodiment according to the present invention is described by reference to FIG. 3. The embodiment of FIG. 3 differs from that of FIG. 2 in that, as shown in FIG. 3(a) and FIG. 3(d), no offset is added while the focus servo loop is kept closed, and, accordingly, the magnitude of the detection level of the acquiring level detecting circuit 112 is equal to that of an offset level instead of the ground level. The objective lens 104 approaches an in-focus position by means of the ramp circuit 116 and the acquiring level detecting circuit 112 detects that a focus error signal reaches the level L. Based on this detection, a detection signal is provided from the acquiring level detecting circuit 112 to the microprocessor 114. As shown in FIG. 3(c), in response to the detection signal, the microprocessor 114 generates a loop-on signal for enabling the switch 118 in a certain period of time after the detection indicated in FIG. 3(b). As in the embodiment of FIG. 2, however, output of the loop-on signal can instead be timed to be simultaneous with the detection.

When the loop-on signal is outputted, a contact of the switch 118 is changed over from the ramp circuit side to the focus error signal side. Accordingly, a signal from the ramp circuit 116 is shut off and the focus servo loop is closed. In addition, as shown in FIG. 3(d), as soon as the loop-on signal has been outputted, an offset of the predetermined level L is immediately added to the focus error signal. Then, the value of the offset is gradually decreased to zero. As in the case of the first embodiment, the magnitude L of the offset to be added to the focus error signal is set to a value smaller than the maximum of various peaks of focus error signals in consideration of variations in focus error signals between various optical disk drive apparatuses. Since the focus servo is thus controlled as if the objective lens 104 was always very close to the in-focus position, as indicated by a curve 300 in FIG. 3(a), the acceleration in movement of the objective lens does not become too large and overshoots are avoided. The embodiment of FIG. 2 is preferred to that of FIG. 3 in that the detection level of the acquiring level detecting circuit 112 is the ground level in the embodiment of FIG. 2, while it is the level of an offset in the embodiment of FIG. 3. This is because the embodiment of FIG. 2 uses the ground level as a detection level and any additional level to be used as a detection level is not needed.

Figure 4:
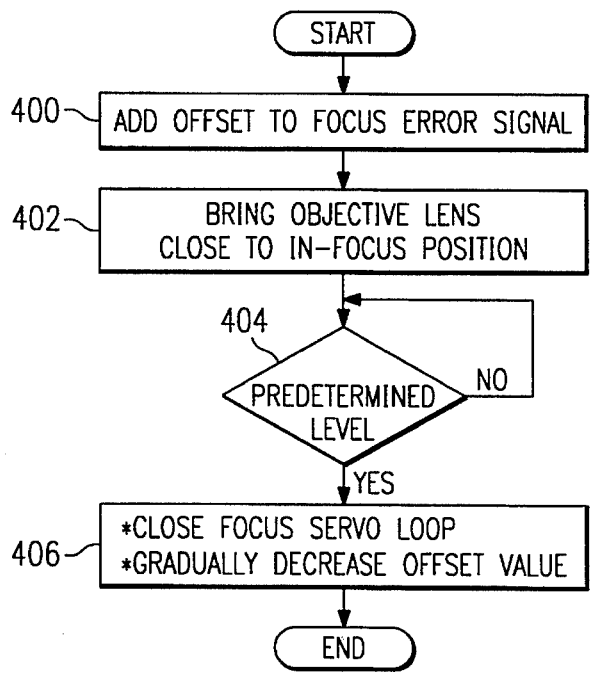
FIG. 4 is a flow chart of the first focus acquisition method according to the present invention.

Next, a method of focus servo control according to the present invention is described. FIG. 4 is a flow chart showing the method described with respect to FIG. 2. Step 400 adds an offset of a predetermined level (L-level) to a focus error signal. Step 402 brings an objective lens close to an in-focus position. Step 404 determines whether the focus error signal to which the offset is added has reached a predetermined acquiring level. If Step 404 has detected that the focus error signal to which the offset is added has reached the predetermined acquiring level (the ground level), then Step 406 closes the focus servo loop and gradually decreases the value of the offset to zero. Thus focus acquisition is successfully completed.

Figure 3:
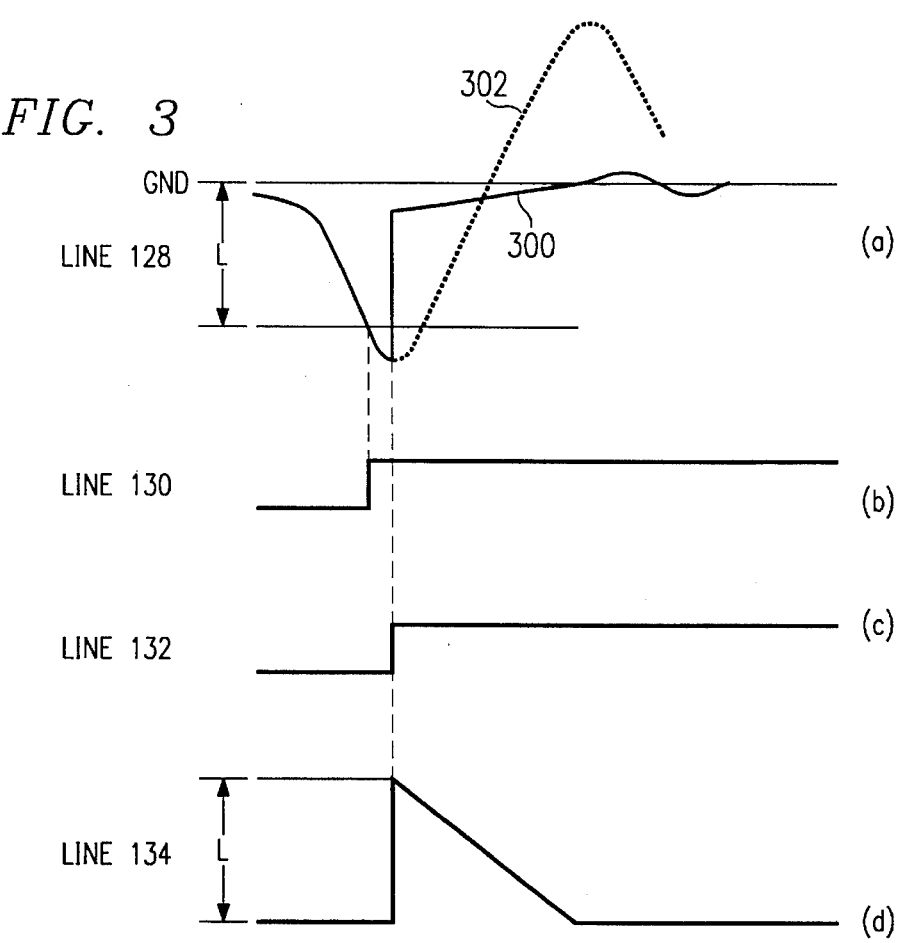
FIG. 3 is a diagram showing a second method of operation of the embodiment of the optical disk drive apparatus according to the present invention.
Figure 5:
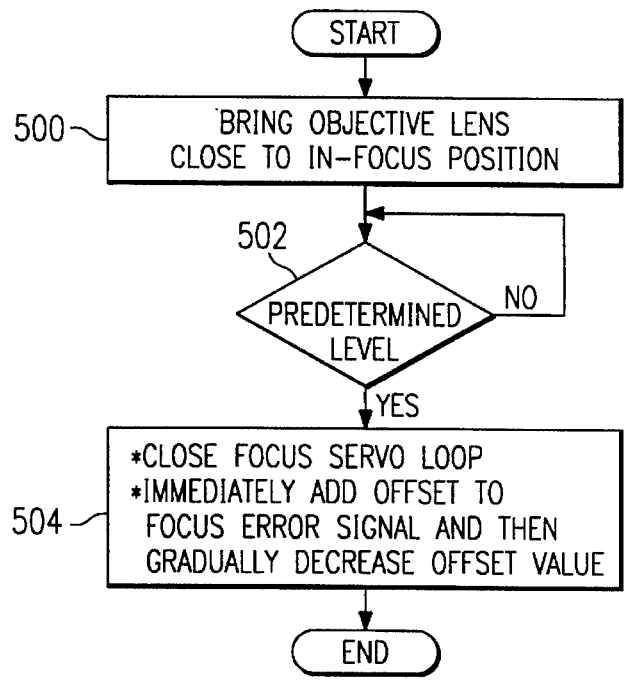
FIG. 5 is a flow chart of the second focus acquisition method according to the present invention.
Figure 6:
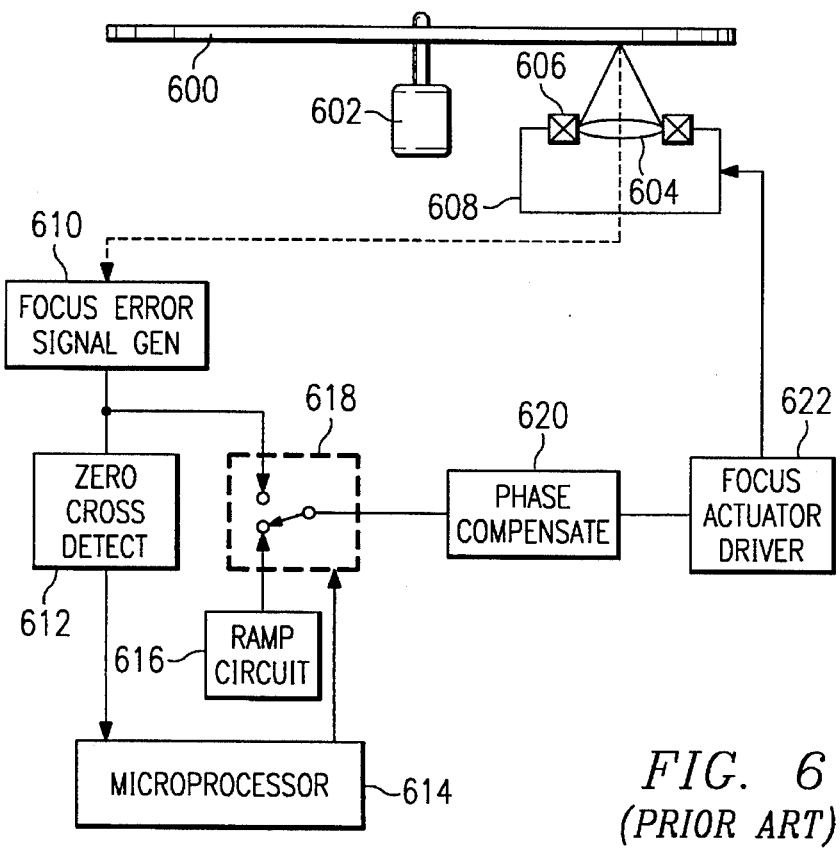
FIG. 6 is a diagram of an optical disk drive apparatus showing a prior art focus acquisition.

FIG. 5 is a flow chart showing the method described with respect to FIG. 3. Step 500 brings the objective lens close to an in-focus position. Step 502 determines whether a focus error signal has reached a predetermined acquiring level (L-level). If Step 502 has detected that the focus error signal has reached the predetermined acquiring level (L-level), then Step 504 closes the focus servo loop, immediately adds an offset of a predetermined level (L-level) to the focus error signal, and gradually decreases the offset to zero. Thus focus acquisition is successfully completed.

Although the above description of the embodiments of a method and apparatus according to the present invention is related to the case where focus acquisition is started while the objective lens is approaching the in-focus position at a distance from a position of the disk, the present invention is not limited to this case. It will be readily understood by those skilled in the art that the present invention can be applied also to the case where focus acquisition is started while the objective lens is approaching the in-focus position from its vicinity on the disk.

As described above, according to the present invention, the value of the offset of a predetermined level added to a focus error signal in response to the closing of a focus servo loop is gradually decreased so that the focus servo is controlled as if an objective lens was always very close to an in-focus position. Consequently, the range of acceleration of the objective lens becomes short as compared with the cases where no offset is applied, and, even if a travelling speed of the objective lens is already high when the loop is closed, successful focus acquisition is ensured because of the very short range of acceleration.

While the invention has been particularly shown and described with reference to preferred embodiments thereof, it will be understood by those skilled in the art that various changes in form and details may be made therein without departing from the spirit and scope of the invention.

What is claimed is:

1. In an optical disk drive apparatus having a spindle motor for rotating a disk, an optical head having an objective lens and a focus actuator for driving said objective lens in a focusing direction, and a focus servo loop for performing focus servo control as a function of a focus error signal, a method of focus acquisition comprising the steps of:

adding an offset of a predetermined level to said focus error signal while said focus servo loop is open;

bringing said objective lens close to an in-focus position while said focus servo loop is open;

detecting that said focus error signal to which said offset having said predetermined level is added reaches a predetermined level;

if it is detected that said focus error signal to which said offset having said predetermined level is added reaches said predetermined level, closing said focus servo loop; and gradually decreasing a value of said offset from said predetermined level.

2. In an optical disk drive apparatus having a spindle motor for rotating a disk, an optical head having an objective lens and a focus actuator for driving said objective lens in a focusing direction, and a focus servo loop for performing focus servo control as a function of a focus error signal, a method of focus acquisition comprising the steps of:

bringing said objective lens close to an in-focus position while said focus servo loop is kept open;

detecting that said focus error signal reaches said predetermined level;

if it is detected that said focus error signal reaches said predetermined level, closing said focus servo loop and immediately adding an offset having a predetermined level to said focus error signal; and then gradually decreasing a value of the offset from said predetermined level.

3. In an optical disk drive apparatus having a spindle motor for rotating a disk, an optical head having an objective lens and a focus actuator for driving said objective lens in a focusing direction, and a focus servo loop for performing focus servo control as a function of a focus error signal, the improvement comprising:

signal generating means for providing said focus actuator with a signal for bringing said objective lens close to an in-focus position while said focus servo loop is open;

switching means for closing said focus servo loop by terminating said signal provided to said focus actuator from said signal generating means;

offset means for adding an offset having a predetermined level to said focus error signal;

level detecting means for detecting that said focus error signal to which said offset is added reaches a predetermined level; and control means for enabling said switching means in response to said level detecting means when it is detected that said predetermined level is reached, and for gradually decreasing a value of said offset from said predetermined level.

4. In an optical disk drive apparatus having a spindle motor for rotating a disk, an optical head having an objective lens and a focus actuator for driving said objective lens in a focusing direction, and a focus servo loop for performing focus servo control as a function of a focus error signal, the improvement comprising:

signal generating means for providing said focus actuator with a signal for bringing said objective lens close to an in-focus position while said focus servo loop is open;

switching means for closing a loop of said focus servo loop by terminating said signal provided to said focus actuator from said signal generating means;

level detecting means for detecting that said focus error signal reaches a predetermined level; and control means for enabling said switching means in response to said level detecting means when it is detected that said predetermined level is reached, for immediately adding an offset having a predetermined level to said focus error signal, and for then gradually decreasing a value of said offset from said predetermined level.

* * * * *